United States Patent
Kim

(10) Patent No.: US 8,895,181 B2
(45) Date of Patent: Nov. 25, 2014

(54) BATTERY MODULE

(75) Inventor: Tae-Yong Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1818 days.

(21) Appl. No.: 11/866,894

(22) Filed: Oct. 3, 2007

(65) Prior Publication Data

US 2008/0131767 A1    Jun. 5, 2008

(30) Foreign Application Priority Data

Dec. 1, 2006  (KR) .................. 10-2006-0120546

(51) Int. Cl.
| | |
|---|---|
| H01M 2/02 | (2006.01) |
| H01M 2/04 | (2006.01) |
| H01M 2/30 | (2006.01) |
| H01M 2/20 | (2006.01) |
| H01M 2/12 | (2006.01) |
| H01M 10/0525 | (2010.01) |

(52) U.S. Cl.
CPC .............. *H01M 2/30* (2013.01); *H01M 2/0426* (2013.01); *H01M 2/0439* (2013.01); *H01M 2/1241* (2013.01); *Y02E 60/12* (2013.01); *H01M 10/0525* (2013.01); *H01M 2/204* (2013.01)
USPC ............ 429/170; 429/123; 429/163; 429/186

(58) Field of Classification Search
CPC .. H01M 2/0426; H01M 2/1241; H01M 2/046
USPC ................... 429/123, 163, 170, 186
See application file for complete search history.

(56) References Cited

U.S. PATENT DOCUMENTS

| | | | | |
|---|---|---|---|---|
| 5,578,392 | A | * | 11/1996 | Kawamura ................. 429/99 |
| 5,853,912 | A | | 12/1998 | Naing et al. |
| 7,618,745 | B2 | * | 11/2009 | Yamashita et al. ........... 429/185 |
| 2004/0043287 | A1 | | 3/2004 | Bando et al. |
| 2005/0244706 | A1 | | 11/2005 | Wu et al. |

FOREIGN PATENT DOCUMENTS

| | | |
|---|---|---|
| CN | 10-1192653 | 6/2008 |
| EP | 1 058 332 A2 | 12/2000 |
| JP | 08-287898 A | 11/1996 |
| JP | 2000-003702 | 1/2000 |

(Continued)

OTHER PUBLICATIONS

Search Report dated Feb. 27, 2008 issued in corresponding European patent application No. 07119071.4 in 5 pages.
Japanese Office Action dated Jul. 19, 2011 in Application No. 2007-284084.

*Primary Examiner* — Zachary Best
(74) *Attorney, Agent, or Firm* — Knobbe Martens Olson & Bear LLP

(57) ABSTRACT

Provided is a battery module that offsets external power exerted on a rechargeable battery not only to protect the rechargeable battery but also to ensure security. The battery module includes: a casing which comprises an electrode assembly and has an open upper portion; a cap assembly which is disposed at an upper portion of the casing so as to seal the casing; and a first connection cap which is disposed on the cap assembly, wherein the first connection cap includes: a cap base which is fixed to the cap assembly and in which one or more indentations are formed at an outermost edge portion thereof; and a cover which protrudes from the cap base in an opposite direction of the cap assembly and has one or more openings at a lateral portion thereof.

20 Claims, 6 Drawing Sheets

(56) References Cited

FOREIGN PATENT DOCUMENTS

| | | |
|---|---|---|
| JP | 2000-195496 | 7/2000 |
| JP | 2003-288952 A | 10/2003 |
| KR | 2001-0095063 A | 3/2001 |
| KR | 10-2004-0035411 A | 4/2004 |
| KR | 10-2004-0099525 A | 12/2004 |
| KR | 10-2005-0094662 A | 9/2005 |
| WO | 20061112251 A1 | 10/2006 |

* cited by examiner

BATTERY MODULE

CROSS-REFERENCE TO RELATED APPLICATIONS

This application claims priority to and the benefit of Korean Patent Application No. 10-2006-0120546, filed on Dec. 1, 2006, in the Korean Intellectual Property Office, the entire content of which is incorporated herein by reference.

BACKGROUND

1. Field

The present disclosure relates to a battery module, and more particularly, to a battery module that is improved to offset external forces exerted on a rechargeable battery.

2. Description of the Related Technology

In general, a battery module is constructed with multiple rechargeable batteries connected to one another. The rechargeable batteries can be repeatedly charged and discharged due to reversible mutual transformations between chemical energy and electrical energy. Recently, with the increase in development of portable wireless electronic devices, in order to make the devices small in size and light in weight, there is a growing need for a rechargeable battery with high energy density.

Examples of widely used rechargeable batteries include a nickel-cadmium battery, a nickel-hydrogen battery, and a lithium rechargeable battery. In particular, the lithium rechargeable battery has an operation voltage equal to or greater than 3.6V, which is as three times higher than an operation voltage of the nickel-cadmium battery or the nickel-hydrogen battery. Furthermore, due to its high energy density per unit weight, the lithium rechargeable battery is rapidly growing in popularity as a power source of a portable electronic device. The lithium rechargeable battery may be classified as a lithium ion rechargeable battery, a lithium ion polymer battery, or a lithium polymer battery.

A typically rechargeable battery includes an electrode assembly in which a positive electrode and a negative electrode are interposed between a separator, a casing which has a space containing the electrode assembly, and a cap assembly which is joined with the casing so as to seal the casing. The rechargeable battery may be manufactured in various shapes according to the shapes of the electrode assembly and the casing. In general, the rechargeable battery may be a cylindrical type rechargeable battery, a prismatic type rechargeable battery, or a pouch type rechargeable battery.

The battery module having the aforementioned structure, in which a plurality of rechargeable batteries are connected, is widely used not only for small portable electric devices such as a cellular phone, a personal computer, and a camcorder but also for motor driving power sources for hybrid electric vehicles.

External forces generated due to various reasons may be exerted on the battery module. The external forces may adversely affect the respective rechargeable batteries constituting the battery module. For example, the casing of the rechargeable battery may be damaged by the external force. In addition, the electrode assembly located inside the rechargeable battery may be damaged, thereby causing a short circuit.

SUMMARY

The present invention provides a battery module that offsets external forces exerted on respective rechargeable batteries constituting the battery module not only to protect the rechargeable batteries but also to ensure safety.

In particular, one aspect of the present invention provides battery module comprising a casing which comprises an electrode assembly and defines an open upper portion, a cap assembly which is disposed at said upper portion of the casing so as to seal the casing and a first connection cap which is disposed on the cap assembly and comprises a cap base and a cover, wherein said cap base is fixed to the cap assembly and comprises a rim and an indentation formed on the rim, and wherein said cover comprises a side wall extending from the cap base away from the cap assembly, and wherein said cover further comprises an opening through the side wall. The battery module of claim 1, wherein said first connection cap comprises a shallow portion defined between the indentation and the opening, wherein the shallow portion is configured to first break upon exertion of an external force to the first connection cap so as to avoid or inhibit greater damage to the battery module.

The shallow portion may have a distance between the indentation and the opening, wherein the distance is in the range of approximately 0.6 mm to approximately 3.5 mm. The cap base may comprise at least one additional indentation formed on the rim, and said cover comprises at least one additional opening through the side wall. One of the indentations may be located on the rim such that distances therefrom to two neighboring ones of the at least two openings are generally the same. One of the indentations may be located on the rim in a direction radially outward from a portion of the side wall between two neighboring ones of the openings. The total number of said indentations may be the same as the total number of the openings.

The cap base may be formed in a ring shape with an inner edge, and wherein the side wall of the cover extends from the inner edge of the cap base. The cap base may comprise four total indentations formed on the rim, and said cover may comprise at least one additional opening through the side wall. The cap base may be welded onto the cap assembly. The battery module may further comprise a fixing element disposed in an inner space of the cover, wherein the fixing element may be configured to fix the battery module with a connector for interconnecting two or more battery modules. The fixing element may be a bolt or a nut. The fixing element may be fixed to an interior surface of the cover by welding.

The battery module may further comprise a second connection cap disposed at a lower surface of the casing, wherein the second connection cap may comprise a second cap base which may be fixed to the lower surface of the casing and may comprise a second rim and a second indentation formed on the second rim, and a second cover which may comprise a second side wall extending from the second cap base away from the casing, and wherein said second cover further may comprise a second opening through the second side wall. The second connection cap may comprise at least one additional second indentation formed on the second rim, and said second cover may comprise at least one additional second opening through the second side wall. One of the second indentations may be located on the second rim in a direction radially outward from a portion of the second side wall between two neighboring ones of the second openings.

The total number of said second indentations may be the same as the total number of the second openings. The second connection cap may comprise a second shallow portion defined between the second indentation and the second opening, wherein the second shallow portion may be configured to first break upon exertion of an external force to the second connection cap so as to avoid or inhibit greater damage to the battery module. The battery module may further comprise a second fixing element disposed at a second inner space of the second cover.

Another aspect of the present invention discloses a method of manufacturing a battery module comprising the steps of providing a casing which may comprise an electrode assembly and defines an open upper portion, providing a cap assembly which may be disposed at said upper portion of the casing so as to seal the casing, fixing a first connection cap onto the cap assembly, the first connection cap comprising a cap base and a cover, and fixing a second connection cap onto a lower surface of the casing, wherein said cap base may be fixed to the cap assembly and may comprise a rim and a plurality of indentations formed on the rim, and wherein said cover may comprise a side wall extending from the cap base away from the cap assembly, and wherein said cover further may comprise a plurality of openings through the side wall.

According to another aspect of the present invention, there is provided a battery module comprising: a casing which contains an electrode assembly and has an open upper portion; a cap assembly which is disposed at an upper portion of the casing so as to seal the casing; and a first connection cap which is disposed on the cap assembly, wherein the first connection cap includes: a cap base which is fixed to the cap assembly and in which one or more indentations are formed at an outermost edge portion thereof; and a cover which protrudes from the cap base in an opposite direction of the cap assembly and has an opening at a lateral portion thereof.

In the aforementioned aspect of the present invention, the first connection cap may include one or more pairs of adjacent openings at the cover, and each of the indentations of the cap base may be formed between a pair of adjacent openings. Further, the indentation in the cap base may be biased in one direction between one pair of the adjacent openings. Further, the openings may be provided in a plural number, the indentations may be formed in the same number as the openings, and the respective indentations may be biased in the same direction between each pair of the adjacent openings. Further, the shortest distance in the first connection cap between each of the openings and each of the indentations may be in the range of 0.6 mm to 3.5 mm.

In addition, the cap base may be formed in a ring shape having a vertical opening portion, and the cover may protrude from an inner edge portion of the cap base.

In addition, four openings may be formed in the cover, four cut portions may be formed in the cap base, and the cut portions may be biased in the same direction between the adjacent openings among the four openings.

In addition, the cap base may be fixed on the cap assembly by using laser welding or resistance welding.

In addition, the battery module may further comprise a fixing element disposed in an inner space of the cover. Further, the fixing element may be a bolt or a nut. Further, the fixing element may be fixed to an inner upper surface of the cover by welding.

In addition, the battery module may further comprise a second connection cap disposed at a lower surface of the casing, wherein the second connection cap includes: a second cap base which is fixed to the lower surface of the casing and has a second cut portion at an outermost edge thereof; and a second cover which protrudes from the second cap base in an opposite direction of the lower surface of the casing and has a second opening at a lateral portion thereof.

In addition, the second connection cap may comprise one or more pairs of the adjacent second openings in the second cover, and the second cut portion of the second cap base may be formed between one pair of the adjacent second openings. Further, the second cut portion of the second cap base may be biased in one direction between one pair of the adjacent second openings.

In addition, the second openings may be provided in a plural number, the second cut portions may be formed in the same number as the second openings, and the respective second cut portions may be biased in the same direction between one pair of the adjacent openings. Further, the second connection cap may have a shortest distance in the range of 0.6 mm to 3.5 mm between the second openings and the second cut portion.

In addition, the battery module may further comprise a fixing element disposed at an inner space of the second cover.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF PREFERRED EMBODIMENTS

With reference to the accompanying drawings, embodiments of the present invention will be described in order to enable those of ordinary skill in the art to implement it. The described embodiments may be modified in various different ways, all without departing from the spirit or scope of the present invention. For clarity, description of some constructions and elements not directly related to the present invention will be omitted, and the same reference numbers will be used throughout the drawings to refer to the same or similar parts. Detailed descriptions for well-known skills will be omitted.

Figure 1:
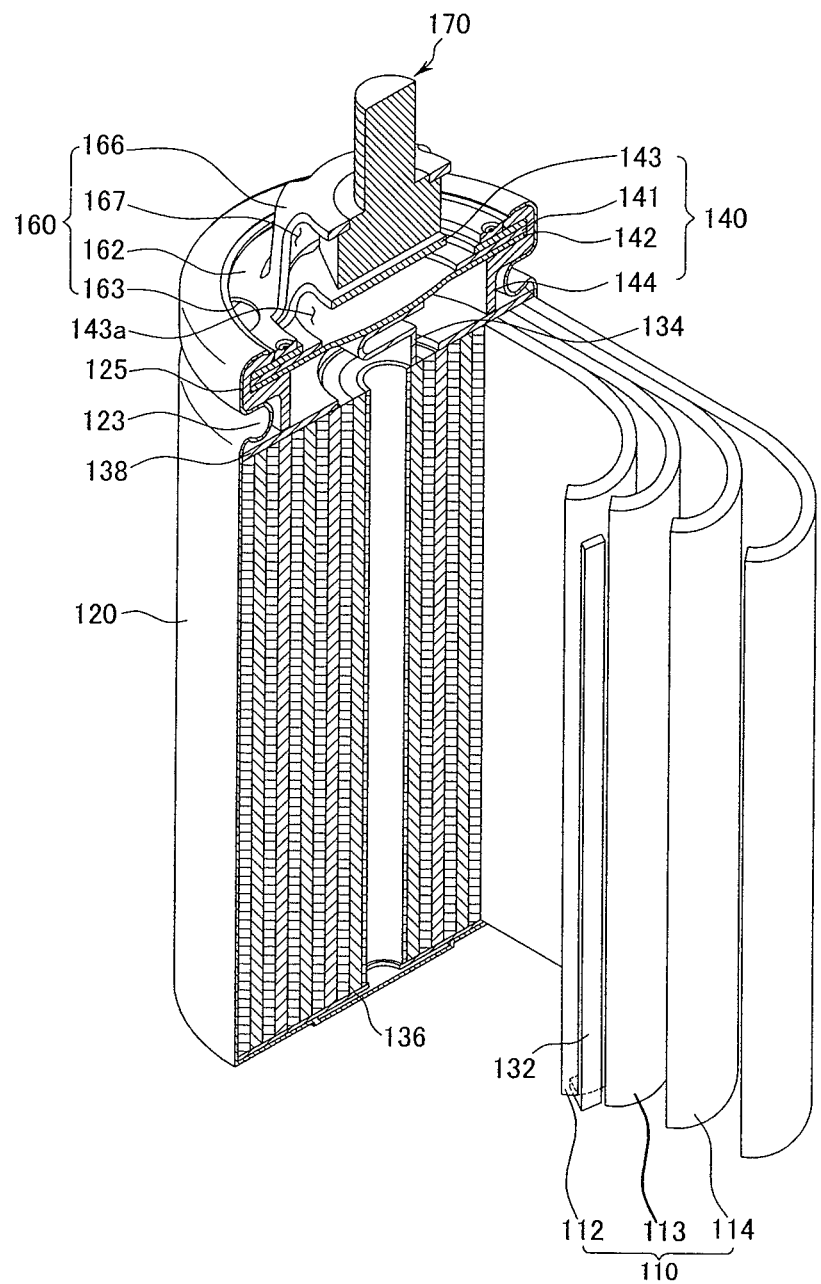
FIG. 1 is a perspective cross-sectional view of a rechargeable battery used in a battery module according to a first embodiment of the present invention.

FIG. 1 is a perspective cross-sectional view of a rechargeable battery 105 used in a battery module according to a first embodiment of the present invention. The rechargeable battery 105 used in this embodiment can be a lithium ion rechargeable battery. However, this is only an exemplary embodiment, and thus the present invention is not limited to the battery module constructed with a lithium ion rechargeable battery. In addition, the rechargeable battery 105 may be not only a cylindrical type rechargeable battery but also a prismatic type or a pouch type rechargeable battery.

Referring to FIG. 1, the rechargeable battery 105 comprises an electrode assembly 110, a casing 120, and a cap assembly 140; and a first connection cap 160 that can be used to connect the rechargeable battery 105 to another rechargeable battery (not shown) positioned adjacent to the rechargeable battery 105.

The electrode assembly 110 of the rechargeable battery 105 includes: a negative electrode 112 in which a negative electrode active material is coated on a collector plate; a positive electrode 114 in which a positive electrode active material is coated on the collector plate; and a separator 113 which is disposed between the negative electrode 112 and the positive electrode 114 so as to avoid a short circuit occurring therebetween.

Specifically, the negative electrode 112 is manufactured so that a slurry type active material layer in which a negative electrode active material powder, a negative electrode binder, and a binding material are mixed and coated on a collector such as a copper plate. In this case, the negative electrode active material may be made of a carbon material as a main material, the carbon material being composed of natural graphite, artificial graphite, graphite-type carbon, non-graphite-type carbon, or a combination or compound of any of these materials. A negative electrode tab 132 is joined with the negative electrode 112. The negative electrode tab 132 comes in contact with the inner bottom surface of the casing 120. Accordingly, the casing 120 acts as a negative electrode. Of course, instead of the negative electrode tab 132, those of ordinary skill in the art will clearly understand that another structure may also be used in which a negative electrode collector plate (not shown) is connected to the negative electrode tab 132 (not shown).

The positive electrode 114 is manufactured so that a slurry type active material layer in which a positive electrode active material powder, a positive electrode binder, and a positive electrode conductive additive are mixed and uniformly coated on a collector such as an aluminum plate. In this case, the positive electrode active material may be lithium metal oxidant such as $LiCoO_2$, $LiMnO_2$, $LiNiO_2$, $LiCrO_2$, or $LiMn_2O_4$. A positive electrode tab 134 is joined with the positive electrode 114. The positive electrode tab 134 protrudes from the positive electrode 114 to come in contact with a safety member 142 of the cap assembly 140. Instead of the positive electrode tab 134, a positive electrode collector plate (not shown) may be connected to the positive electrode 114. In that case, a lead tab (not shown) of the positive electrode collector plate can be connected to the cap assembly 140.

The separator 113 separates the negative electrode 112 from the positive electrode 114 and provides a passage through which lithium ions transfer. The separator 113 may be constructed of a polyethylene layer, a polypropylene layer, a poly vinylidene fluoride layer, or a multi-layered film formed of two or more of these layers. Alternatively, the separator 113 may be a mixed, multilayered film such as a polyethylene/polypropylene film, a three-layered polyethylene/polypropylene/polyethylene film, or, a three-layered polypropylene/polyethylene/polypropylene film.

The negative electrode 112, the separator 113, and the positive electrode 114 are sequentially laminated in order to form the electrode assembly 110, and a center bar (not shown) is joined at one end thereof and is then wound in a substantially cylindrical shape. The fully assembled electrode assembly 110 is then inserted into the casing 120. The center bar is separated from the electrode assembly 110. A center pin (not shown) may be inserted into a hollow portion which is formed by the separation of the center bar. The center pin protects the electrode assembly 110 against deformation that can be produced during charging/discharging. In general, the center pin is formed in a hollow cylindrical shape. The center pin may be made of any of a variety of materials such as iron, copper, nickel, and nickel alloy. Furthermore, the center pin may be made of a polymer material.

The upper and lower isolation plates 138 and 136, respectively, are disposed at the upper and lower portions of the electrode assembly 110, respectively, so as to prevent an unnecessary short circuit between the electrode assembly 110 and the casing 120.

A substantially cylindrical shaped space is provided inside the casing 120 so as to contain the electrode assembly 110. The upper portion of the casing 120 is open. The electrode assembly 110 can be inserted into the casing 120 through this opening portion. The open upper portion of the casing 120 is joined with the cap assembly 140 so as to seal the casing 120. When the casing 120 is joined with the cap assembly 140, a beading portion 123 and a crimping portion 125 are formed in the casing 120. An electrolyte solution (not shown) is injected into the casing 120. This enables the transfer of lithium ions generated by electrochemical reaction between the negative electrode 112 and the positive electrode 114 during charging/discharging.

The cap assembly 140 includes an electrode cap 143, a positive temperature coefficient element 141, the safety member 142, and a gasket 144. The cap assembly 140 is disposed at the open upper portion of the casing 120 so as to seal the casing 120.

The gasket 144 is disposed between the casing 120 the electrode cap 143, the temperature coefficient element 141, and the safety member 142, and so as to isolate the casing 120 from the elements.

The positive electrode tab 134 connected to the positive electrode 114 is fixed to the lower surface of the safety member 142 by welding or the like. When pressure inside the rechargeable battery 105 is increased to be equal to or greater than a predetermined level, the depression in the safety member 142 becomes inverted an out of physical contact with the positive electrode tab 134. Thereby, the safety member 142 becomes electrically disconnected from the positive electrode 114. In this embodiment, before the pressure inside the rechargeable battery IOS reaches a predetermined level, the safety member 142 and the positive electrode tab 134 are in contact with each other. However, those of ordinary skill in the art will clearly understand that another structure may also be used in which an insulating member (not shown) and a cap plate (not shown) are further sequentially laminated at the lower portion of the safety member 142, and the positive electrode tab 134 is joined with the cap plate.

The temperature coefficient element 141 is connected to the upper portion of the safety member 142. The temperature coefficient element 141 is a device of which resistance increases almost infinitely when temperature is increased to be equal to or greater than a predetermined level. When the temperature of the rechargeable battery 105 is increased to the predetermined level, the temperature coefficient element 141 can stop charge or discharge current from flowing. However, when the temperature of the rechargeable battery 105 is decreased to be less than the predetermined level, the electrical resistance of the temperature coefficient element 141 is decreased. Therefore, original functions of the rechargeable battery 105 can be recovered.

In addition to the safety member 142 and the temperature coefficient element 141, the battery module according to this embodiment may further include additional safety means in order to avoid over-charging, over-discharging, over-heating, and abnormal current.

The electrode cap 143 is connected to the upper portion of the temperature coefficient element 141 so as to act as a positive electrode that provides current to external elements.

A degassing hole 143a may be formed at the lateral portion of the electrode cap 143 so that gas inside the rechargeable battery 105 can be exhausted to the outside when the safety member 142 is damaged.

The first connection cap 160 includes: a first cap base 162 in which a first indentation 163 is formed; and a first cover 166 in which a first opening 167 is formed. The first connection cap 160 can be fixed to the electrode cap 143 by welding. In addition, as a fixing element, a bolt 170 can protrude from the first cover portion 166.

The first connection cap 160 and the fixing element, along with a second connection cap 360 (see FIG. 5) and a connection member 175 (see FIG. 6) which will be described later, can be used to connect a plurality of rechargeable batteries. The first connection cap 160 and the fixing element will be described in detail with reference to FIG. 2.

Figure 2:
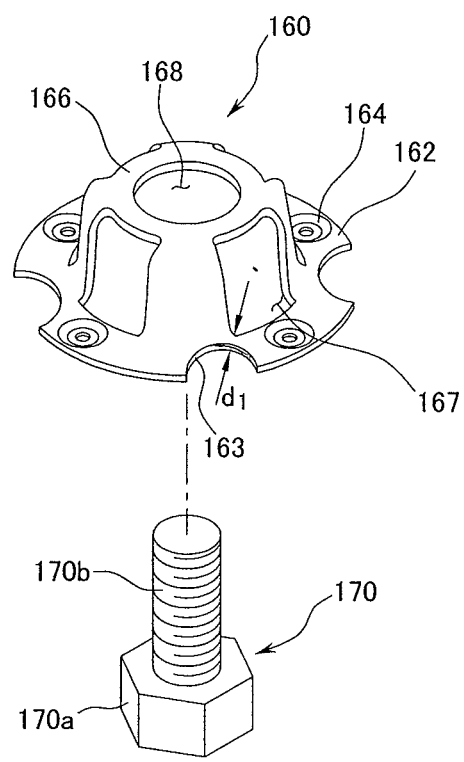
FIG. 2 is an exploded perspective view of a first connection cap and a bolt that is a fixing element, which are shown in FIG. 1.

FIG. 2 is an exploded perspective view of the first connection cap 160 and the bolt 170 that is the fixing element, which are shown in FIG. 1. Referring to FIG. 2, the first cap base 162 of the first connection cap 160 is formed in a ring shape having a vertical opening portion 168. The first cut portions 163 are formed at the outermost edge portion of the first cap base 162 in a substantially semi-circular shape. In addition, the first cap base 162 can be joined with the electrode cap 143 (see FIG. 1) by using resistance welding or laser welding. First depressed portions 164 may be formed in the first cap base 162 so that a welding electrode can be inserted therein.

The first cover 166 of the first connection cap 160 protrudes from the inner edge portion of the first cap base 162. In embodiment illustrated in FIG. 1, the first cover 166 integrally formed in the first cap base 162, but the invention is not so limited. Alternatively, the first cover 166 constructed with an additional member may be connected to the first cap base 162. Four first openings 167 are formed at the lateral portion of the first cover 166. Similar to the degassing hole 143a formed in the electrode cap 143 (see FIG. 1), the first openings 167 allow gas inside the rechargeable battery 105 to be able to be exhausted to the outside when the safety member 142 is damaged.

In this embodiment, the four first indentations 163 are formed. Each of the first indentations 163 is formed between each of the adjacent first openings 167 among the four first openings 167. Specifically, the first indentations 163 are biased in the same direction between the adjacent first openings 167. That is, the four first openings 167 and the four first indentations 163 are respectively formed in pair. In this case, a shortest distance d1 between a pair of the first opening 167 and the first indentation 163 may be formed according to capacity and size of the rechargeable battery 105, approximately in the range of 0.6 mm to 3.5 mm.

Referring to FIG. 2, the distance d1 between the first indentation 163, and the first opening 167 nearest to this first indentation 163 is short. Thus, a stress resulting from an external force can be concentrated on this portion of the first cap base 162 between the indentations 163 and the openings 167. As a result, damage will likely occur between the first indentation 163 and the first openings 167 nearest to the first indentation 163. That is, when external forces are exerted on the rechargeable battery IOS, damage will likely first occur at a portion between the first opening 167 and its corresponding first indentation 163. Due to this buffer effect, the external forces exerted on the rechargeable battery 105 can, accordingly, be minimized.

Meanwhile, the fixing element is disposed at the inner portion of the first cover 166. In embodiment illustrated in FIG. 1, the bolt 170 is used as the fixing element. A head 170a of the bolt 170 is fixed to the inner upper surface of the first cover 166 by welding or pressing. A bolt body 170b integrally connected to the bolt head 170a passes through an opening portion 168 formed at the upper surface of the first cover 166.

Returning to FIG. 6, when the battery module 100 is constructed with a plurality of the rechargeable batteries 105, the connection member 175 is connected to the respective bolts 170 of the adjacent rechargeable batteries 105. The connection members 175 can be fixed to the adjacent rechargeable batteries 105 by fixing nuts 190 (see FIG. 6). Accordingly, the adjacent rechargeable batteries 105 can be electrically connected with one another.

Figure 3:
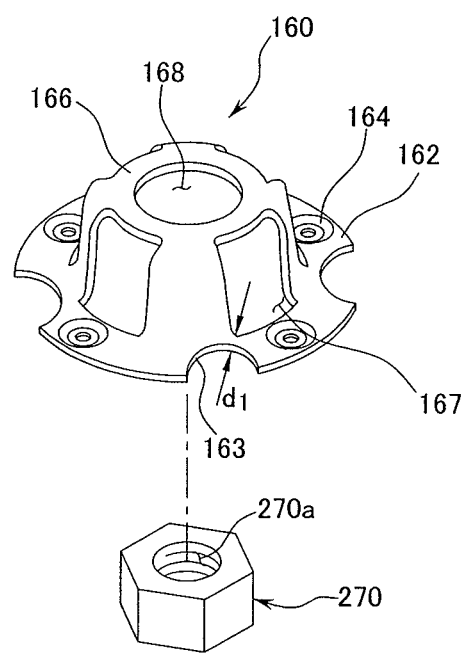
FIG. 3 illustrates a nut used as a fixing element shown in FIGS. 1 and 2.

Referring to FIG. 3, as the fixing element, a nut 270 may be fixed at the inner portion of the first cover 166. The nut 270 can be fixed at the inner upper surface of the first cover 166 by welding or pressing. In this configuration, the center of the opening portion 168 of the first cover 166 may be disposed at the same vertical line as the center of a groove 270a of the nut 270.

Figure 4:
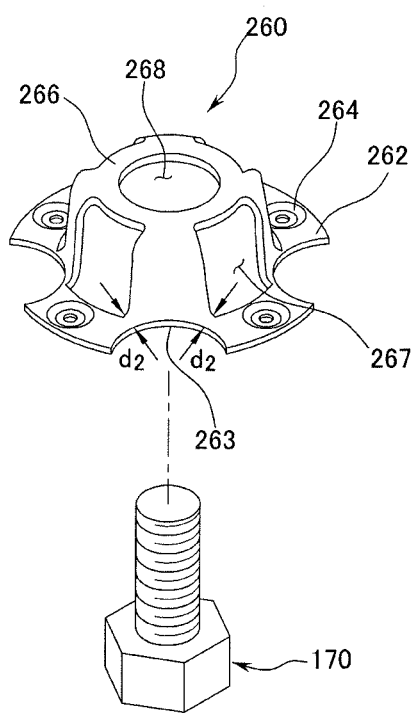
FIG. 4 is an exploded perspective view of a first connection cap and a fixing element, which are used in a battery module according to a second embodiment of the present invention.

FIG. 4 is an exploded perspective view of a first connection cap 260 and the fixing element 170 used in a battery module according to a second embodiment of the present invention. Referring to FIG. 4, a first cap base 262 of the first connection cap 260 can be formed in a ring shape having a vertical opening portion. First indentations 263 are formed at the outermost edge portion of the first cap base 262 in a substantially semi-circular shape. In addition, the first cap base 262 can be joined with the electrode cap 143 (see FIG. 1) by using resistance welding or laser welding. First depressed portions 264 may be formed in the first cap base 262 so that a welding electrode can be inserted therein.

A first cover 266 of the first connection cap 260 protrudes from the inner edge portion of the first cap base 262. In this configuration, the first cover 266 may be integrally formed in the first cap base 262, but is not so limited. Alternatively, the first cover 266 constructed as a separate member may be connected to the first cap base 262. Four first openings 267 are formed at the lateral portion of the first cover 266. Similar to the degassing hole 143a formed in the electrode cap 143 (see FIG. 1), the first openings 267 allow gas inside the rechargeable battery 105 to be exhausted to the outside when the safety member 142 is damaged.

In this embodiment, the four first indentations 263 are formed in the first cap base 262. Each of the first indentations 263 is formed between each of a pair of the first openings 267. The centers of the first indentations 263 may be disposed at the same line as the center of a space between each pair of the adjacent first openings 267. Each of shortest distances d2 between the first indentations 263 and their adjacent first openings 267 are the same. The shortest distance d2 can be formed according to the capacity and size of the rechargeable battery 105. For example, the shortest distance d2 may be in the range of 0.6 mm to 3.5 mm.

When external forces are exerted on the battery module constructed with a plurality of rechargeable batteries, the shortest distance d2 between the first opening 267 and the first indentation 263 is preferably short. Thus, a stress can be concentrated on this portion. As a result, damage may first occur between the first indentation 263 and the first opening 267. That is, when external force is exerted, damage first occurs at a portion between the first opening 267 and the first indentation 263. Due to a buffer effect, the external forces exerted on the rechargeable battery 105 can be minimized.

Figure 5:
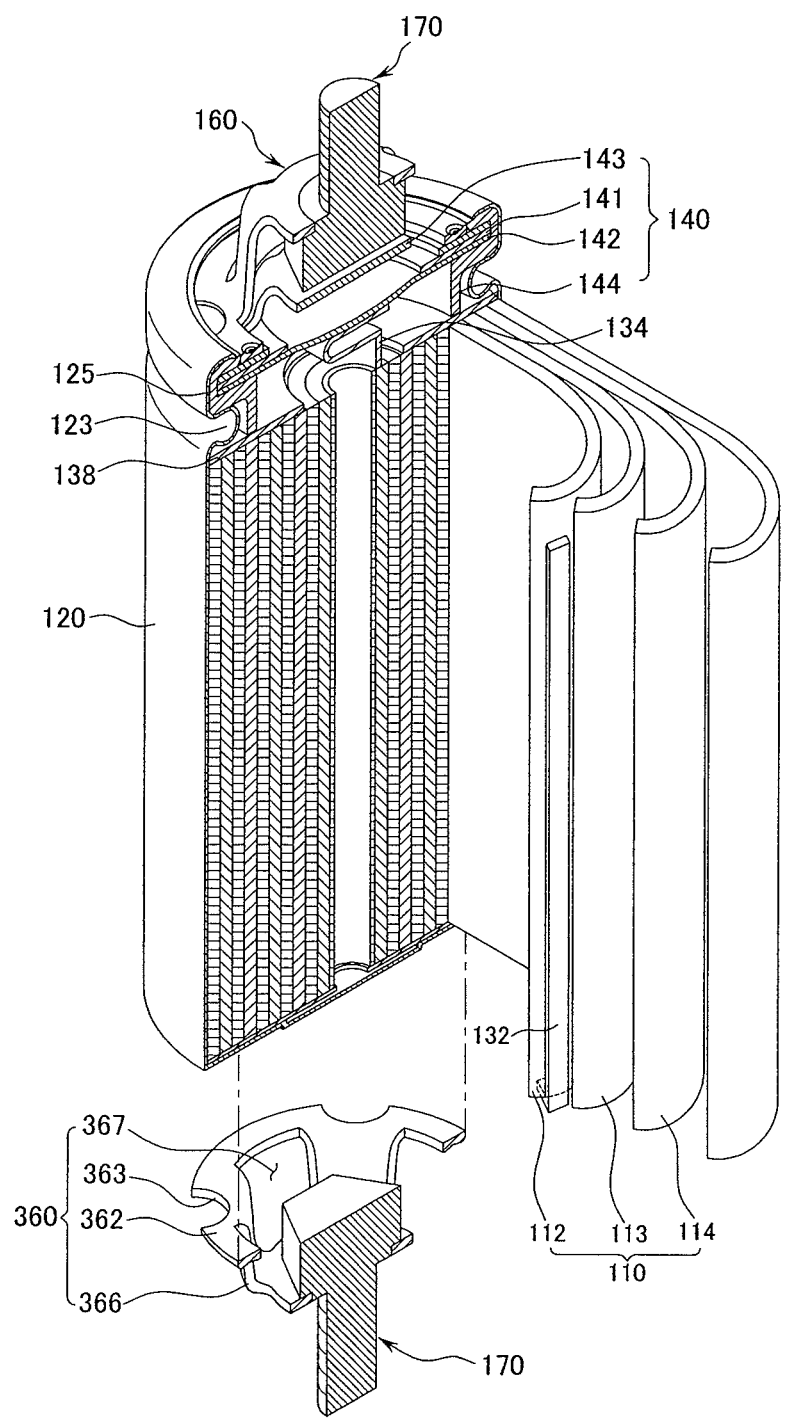
FIG. 5 is an exploded perspective cross-sectional view of a second connection cap and a rechargeable battery shown in FIG. 1.

FIG. 5 is an exploded perspective cross-sectional view of the second connection cap 360 and the rechargeable battery 105 shown in FIG. 1. The second cap base 362, which has a second indentation 363, and the second connection cap 360 which includes a second cover 366 having a second opening 367, have the same or similar structure as the aforementioned first connection cap 160 described above. However, there is a slight difference in that the cap base 362 of the second connection cap 360 is fixed to the lower surface of the casing 120 of the rechargeable battery 105. In addition, as the fixing element, the bolt 170 is fixed at the inner portion of the second cover 366 of the second connection cap 360. The nut 270 (see FIG. 3) may be fixed to the inner portion of the second cover 366. The second connection cap 360 may be used to connect a plurality of rechargeable batteries along with the aforementioned first connection cap 160, the fixing element, and the connection member 175 (see FIG. 6) to be described later.

Figure 6:
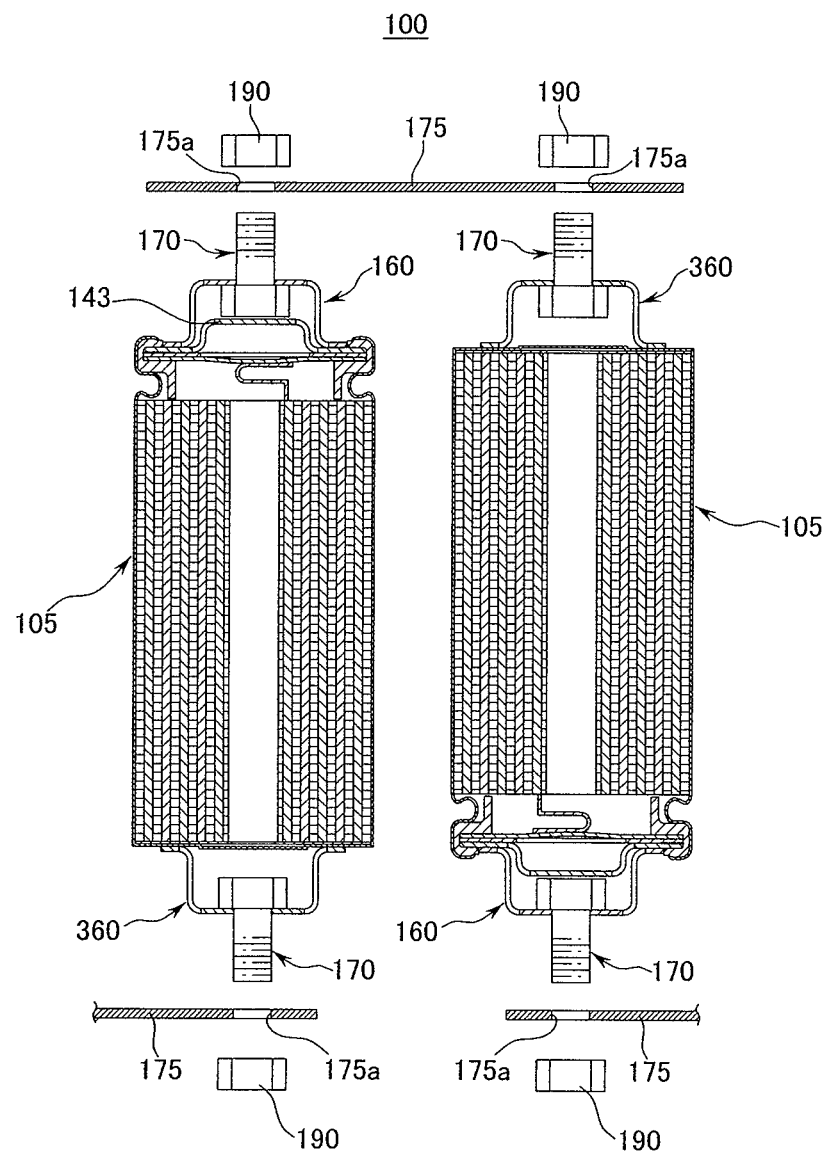
FIG. 6 is an exploded cross-sectional view of a battery module connected with a plurality of rechargeable batteries.

FIG. 6 is an exploded cross-sectional view of the battery module 100 connected with a plurality of the rechargeable batteries 105. Referring to FIG. 6, the adjacent rechargeable batteries 105 are separated from each other. That is, the first connection cap 160 of the first rechargeable battery 105, which is any one of the rechargeable batteries 105 described herein, and the second connection cap 360 of the second rechargeable battery 105 adjacent to the first rechargeable battery 105, are oriented in the same direction, thereby being arranged in parallel in a radius direction. Thereafter, the connection member 175 is disposed on the first connection cap 160 and the second connection cap 360.

The connection member 175 is a conductor that connects the rechargeable batteries 105. The connection member 175 may be manufactured in various shapes. However, in this embodiment, the connection member 175 has a rectangular plate shape. First and second through-holes 175a are formed at both edge portions of the connection member 175.

The bolts 170 are inserted into the first and second through-holes 175a. In this configuration, the connection member 175 can be fixed to the first and second connection caps 160 and 360 by tightening the nuts 190 on the bolts 170.

The battery module 100 having the aforementioned structure can concentrate a stress between each opening and each indentation of the first and second connection caps 160 and 360. Thus, it is possible to protect the rechargeable batteries 105 against damage or a short circuit.

According to the present invention, since a stress can be exerted on first and second connection cap, it is possible to offset external forces exerted on respective rechargeable batteries constituting a battery module. Therefore, the rechargeable batteries can be protected against damage caused by the external forces exerted on the battery module. Furthermore, an electrode assembly can be prevented from damage, thereby avoiding a short circuit. In addition, the present invention can prevent explosion of the rechargeable batteries caused by damage or the occurrence of the short circuit of the rechargeable batteries. Furthermore, devices employing the rechargeable batteries can be prevented from a fire, thereby ensuring safety.

What is claimed is:

1. A battery module comprising:
    a casing which comprises an electrode assembly and defines an open upper portion;
    a cap assembly which is disposed at said upper portion of the casing so as to seal the casing; and
    a first connection cap which is disposed on the cap assembly and comprises a cap base and a cover;
    wherein said cap base is fixed to the cap assembly and comprises a rim and an indentation formed on the rim;
    wherein said cover comprises a side wall extending from the cap base away from the cap assembly;
    wherein said cover further comprises an opening through the side wall that is enclosed by the side wall; and
    wherein the rim includes a depressed portion for interconnecting the rim to the cap assembly and wherein the depressed portion is formed in the rim so that the depressed portion is positioned on the rim in front of the opening in the side wall and wherein the indentation in the rim is positioned in the rim so as to be offset from a corner of the opening in the side wall.

2. The battery module of claim 1, wherein said first connection cap comprises a shallow portion defined between the indentation and the opening, wherein the shallow portion is configured to first break upon exertion of an external force to the first connection cap so as to avoid or inhibit greater damage to the battery module.

3. The battery module of claim 2, wherein said shallow portion has a distance between the indentation and the opening, wherein the distance is in the range of approximately 0.6 mm to approximately 3.5 mm.

4. The battery module of claim 1, wherein said cap base comprises at least one additional indentation formed on the rim, and said cover comprises at least one additional opening through the side wall.

5. The battery module of claim 4, wherein one of the indentations is located on the rim such that distances therefrom to two neighboring ones of the at least two openings are generally the same.

6. The battery module of claim 4, wherein one of the indentations is located on the rim in a direction radially outward from a portion of the side wall between two neighboring ones of the openings.

7. The battery module of claim 4, wherein at least one portion of one indentation is formed on the rim between two neighboring ones of the openings.

8. The battery module of claim 7, wherein one indentation is biased in a direction between two neighboring ones of the openings.

9. The battery module of claim 1, wherein the cap base is formed in a ring shape with an inner edge, and wherein the side wall of the cover extends from the inner edge of the cap base.

10. The battery module of claim 1, wherein the cap base is welded onto the cap assembly.

11. The battery module of claim 1, further comprising a fixing element disposed in an inner space of the cover, wherein the fixing element is configured to fix the battery module with a connector for interconnecting two or more battery modules.

12. The battery module of claim 11, wherein the fixing element is a bolt or a nut.

13. The battery module of claim 11, wherein the fixing element is fixed to an interior surface of the cover by welding.

14. The battery module of claim 1, further comprising a second connection cap disposed at a lower surface of the casing, wherein the second connection cap comprises:
    a second cap base which is fixed to the lower surface of the casing and comprises a second rim and a second indentation formed on the second rim, and
    a second cover which comprises a second side wall extending from the second cap base away from the casing, and wherein said second cover further comprises a second opening through the second side wall.

15. The battery module of claim 14, wherein the second connection cap comprises at least one additional second indentation formed on the second rim, and said second cover comprises at least one additional second opening through the second side wall.

16. The battery module of claim 15, wherein one of the second indentations is located on the second rim in a direction radially outward from a portion of the second side wall between two neighboring ones of the second openings.

17. The battery module of claim 15, wherein the total number of said second indentations is the same as the total number of the second openings.

18. The battery module of claim 14, wherein said second connection cap comprises a second shallow portion defined between the second indentation and the second opening, wherein the second shallow portion is configured to first break upon exertion of an external force to the second connection cap so as to avoid or inhibit greater damage to the battery module.

19. The battery module of claim 14 further comprising a second fixing element disposed at a second inner space of the second cover.

20. A method of manufacturing a battery module comprising the steps of:
provide a casing which comprises an electrode assembly and defines an open upper portion;
providing a cap assembly which is disposed at said upper portion of the casing so as to seal the casing;
fixing a first connection cap onto the cap assembly, the first connection cap comprising a cap base and a cover; and
fixing a second connection cap onto a lower surface of the casing;
wherein said cap base is fixed to the cap assembly and comprises a rim and a plurality of indentations formed on the rim;
wherein said cover comprises a side wall extending from the cap base away from the cap assembly; and
wherein said cover further comprises a plurality of openings through the side wall that are enclosed by the side wall; and
wherein the rim includes a plurality of depressed portions for interconnecting the rim to the cap assembly and wherein the depressed portions are formed in the rim so that the depressed portions are positioned on the rim in front of the plurality of openings in the side wall and wherein the plurality of indentations in the rim are positioned in the rim so as to be offset from a corner of the plurality of adjacent openings in the side wall.

* * * * *